United States Patent
Colgate et al.

(10) Patent No.: US 11,886,641 B2
(45) Date of Patent: *Jan. 30, 2024

(54) METHOD AND APPARATUS FOR FINGER POSITION TRACKING AND HAPTIC DISPLAY USING CONDUCTIVE ISLANDS

(71) Applicant: Northwestern University, Evanston, IL (US)

(72) Inventors: James E. Colgate, Evanston, IL (US); Michael A. Peshkin, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,734

(22) Filed: Aug. 30, 2022

(65) Prior Publication Data
US 2022/0413618 A1    Dec. 29, 2022

Related U.S. Application Data

(63) Continuation of application No. 16/924,818, filed on Jul. 9, 2020, now Pat. No. 11,442,546, which is a
(Continued)

(51) Int. Cl.
*G06F 3/01* (2006.01)
*G06F 3/041* (2006.01)
(Continued)

(52) U.S. Cl.
CPC ............ *G06F 3/016* (2013.01); *G06F 3/044* (2013.01); *G06F 3/0416* (2013.01);
(Continued)

(58) Field of Classification Search
CPC ...... G06F 3/0412; G06F 3/044; G06F 3/0446; G06F 3/0447; G06F 2203/04102; G06F 2203/04105; G06F 3/0414; G06F 1/1652; G06F 3/0416; G06F 3/016; G06F 3/04164; G06F 2203/04111; H10K 50/814; H10K 50/818; H10K 50/826; H10K 50/856;
(Continued)

(56) References Cited

U.S. PATENT DOCUMENTS

| 2009/0273573 | A1* | 11/2009 | Hotelling | G06F 3/0362 345/173 |
|---|---|---|---|---|
| 2010/0085169 | A1* | 4/2010 | Poupyrev | G06F 3/04886 345/174 |
| 2012/0038583 | A1 | 2/2012 | Westhues et al. | |
| 2012/0287068 | A1* | 11/2012 | Colgate | G06F 3/016 345/173 |

(Continued)

FOREIGN PATENT DOCUMENTS

| KR | 1020130014317 A | 2/2013 |
|---|---|---|
| KR | 1020140023428 A | 2/2014 |

OTHER PUBLICATIONS

International Search Report and Written Opinion filed in PCT/US2016/036866 dated Sep. 22, 2016; 10 pgs.

*Primary Examiner* — Hong Zhou
(74) *Attorney, Agent, or Firm* — Vedder Price P.C.

(57) ABSTRACT

A touchscreen includes conductive islands that are capacitively coupled to conductive traces, where they may be used to provide capacitive sensing of the position of one or more fingers in contact with a touchscreen and/or to exert haptic forces on one or more fingers in contact with a touchscreen.

19 Claims, 10 Drawing Sheets

Frontal View Of Touchscreen

Related U.S. Application Data continuation of application No. 15/178,283, filed on Jun. 9, 2016, now Pat. No. 10,739,853.

(60) Provisional application No. 62/173,732, filed on Jun. 10, 2015.

(51) Int. Cl.
*G06F 3/044* (2006.01)
*G09B 21/00* (2006.01)

(52) U.S. Cl.
CPC ........ *G06F 3/0446* (2019.05); *G06F 3/04164* (2019.05); *G09B 21/003* (2013.01)

(58) Field of Classification Search
CPC ...... H10K 59/40; H10K 77/111; H10K 59/12; H10K 2102/3031; H10K 2102/311; H10K 59/128; G09B 21/003
See application file for complete search history.

(56) References Cited

U.S. PATENT DOCUMENTS

| | | | | |
|---|---|---|---|---|
| 2013/0307789 | A1* | 11/2013 | Karamath | G06F 3/016 345/173 |
| 2014/0211110 | A1 | 7/2014 | Li et al. | |
| 2014/0375580 | A1* | 12/2014 | Peshkin | G06F 3/016 345/173 |
| 2015/0042600 | A1 | 2/2015 | Lukanc et al. | |
| 2015/0355710 | A1* | 12/2015 | Modarres | G09G 5/003 345/173 |

* cited by examiner

METHOD AND APPARATUS FOR FINGER POSITION TRACKING AND HAPTIC DISPLAY USING CONDUCTIVE ISLANDS

CROSS-REFERENCE TO RELATED APPLICATIONS

This application is a continuation of U.S. Pat. No. 11,442,546, titled "Method and Apparatus For Finger Position Tracking and Haptic Display Using Conductive Islands," filed Jul. 9, 2020 which claims benefit of and priority from U.S. Pat. No. 10,739,853, titled "Method and Apparatus For Finger Position Tracking and Haptic Display Using Conductive Islands," filed Jun. 9, 2016 which claims benefit of and priority from Provisional Application No. 62/173,732, titled "Method and Apparatus For Finger Position Tracking and Haptic Display Using Conductive Islands," filed on Jun. 10, 2015.

CONTRACTUAL ORIGIN OF THE INVENTION

This invention was made with government support under grant numbers IIS-0964075 and IIS-1302422 awarded by the National Science Foundation. The government has certain rights in the invention.

FIELD OF THE INVENTION

The present disclosure generally relates to the field of haptics, and more particularly to touchscreens that include conductive islands that are capacitively coupled to conductive traces.

BACKGROUND

Touchscreens have become ubiquitous for computer interface, and are used in mobile phones, tablets, laptop computers, bank kiosks, and many other applications and devices. Touchscreens are able to detect the location of a user's finger in contact with the screen. The detected location then can be used by a computer program to respond to the user's command as expressed by his or her touch, such as to move a graphical object that is visible on the screen or to select a button or menu item.

Usually the touch sensitive screen is transparent and is combined with a visual display so that the user may imagine that he or she is touching or pointing to the objects that are visually portrayed. There are two flows of information involved: visual information from a computer to the user, and touch information from the user to a computer.

Less common is the other direction of conveyance of touch information, in which the user can employ his or her sense of touch to receive information from a computer. This could support the user's perception of edges or textures, or even apparent bumps or depressions of the surface.

The facility to convey touch information to the user is called haptics. A contemporary form of haptics is accomplished by producing vibrations of a handheld device. A user may imagine the vibrations to be originating in his or her interaction with icons or other graphical features portrayed on a visual display. Going beyond vibrational haptics, the term surface haptic display refers to touchscreens in which forces can be generated by the screen and exerted on the user's fingertip at the point that it contacts the screen.

If a touchscreen can separately detect the location of more than one finger in contact with the screen at the same time, this is known as "multitouch." If a surface haptic display can produce different forces on more than one finger in contact with the screen at the same time, this is known as "multi-haptics."

A challenge for surface haptic display is to find ways for a touchscreen, which is usually made of glass, to be able to exert forces on a fingertip that is touching it. The forces must be under software control. Further, the mechanism of force production must not interfere with detection of the location of a fingertip that is touching the screen. Additionally the mechanism of force production should be reasonably transparent, so that a visual display under the touchscreen is not obscured.

One way of accomplishing surface haptic display is to use electrostatic attraction to create forces on a user's fingertip. Transparent electrodes, such as indium tin oxide (ITO), are placed beneath the surface of a touchscreen, which typically is made of glass. The electrodes are charged to a potential relative to that of a user's finger. The electrostatic attraction between the electrode and the user's fingertip increases the contact force between fingertip and glass, and therefore, also increases the frictional force that the user must overcome to move his or her finger across the glass. The user perceives the increased frictional force, which can be modulated under software control to represent icons, textures, edges, and other haptic effects. The force of electrostatic attraction depends on many factors including the potential difference (voltage), surface area, distance between surfaces attracted, frequency of alternation of the sign of the voltage, and the dielectric constant of the material between them.

An object of the disclosure is to provide capacitive sensing of the position of one or more fingers in contact with a touchscreen and/or to exert haptic forces on one or more fingers in contact with a touchscreen.

SUMMARY

This disclosure provides description of constructions and methods of making touchscreens that include conductive islands that are capacitively coupled to conductive traces. The purpose and advantages of the invention will be set forth in and apparent from the description and drawings that follow, as well as will be learned by practice of the claimed subject matter.

One embodiment of the present disclosure includes a touchscreen comprising a front surface having a plurality of conductive islands positioned at a depth in close proximity to the front surface, and wherein the conductive islands are substantially electrically isolated from one another.

Another embodiment includes a plurality of conductive traces, each conductive trace being substantially capacitively coupled to at least two of the conductive islands.

In another embodiment, a plurality of the conductive traces are electrically connected.

In another embodiment, the plurality of conductive traces is positioned above the conductive islands.

In another embodiment, the plurality of conductive traces are each positioned below the conductive islands.

In another embodiment, a capacitive coupling connects a plurality of the conductive traces to additional electronics.

In another embodiment, a location of a fingertip in contact with the touchscreen is determined by measuring a mutual capacitance of a plurality of the conductive traces.

In another embodiment, an attractive electrostatic force on a fingertip is created when the fingertip touches the touchscreen, by charging at least one of the conductive islands that is close to the fingertip, via a capacitive coupling of the at least one conductive island to at least one conductive trace that is in proximity to the at least one conductive island.

In another embodiment, the attractive electrostatic force on a fingertip is diminished, by a reduction in the charge on at least one conductive island that is close to the fingertip, via a capacitive coupling of the at least one conductive island to a second conductive trace that also is in proximity to the at least one conductive island.

In another embodiment, conductive traces pass through an array of the conductive islands in a zigzag pattern.

Another embodiment of the present disclosure includes a method of determining a touch location in a touchscreen, the method including the steps of forming a plurality of conductive islands in a front surface at a depth in close proximity to the front surface substantially electrically isolating the conductive islands from one another.

Another embodiment includes the step of forming a plurality of conductive traces, each conductive trace being substantially capacitively coupled to at least two of the conductive islands.

In another embodiment, a plurality of the conductive traces are electrically connected.

In another embodiment, the plurality of conductive traces is positioned above the conductive islands.

In another embodiment, the plurality of conductive traces are each positioned below the conductive islands.

In another embodiment, a capacitive coupling connects a plurality of the conductive traces to additional electronics.

In another embodiment, a location of a fingertip in contact with the touchscreen is determined by measuring a mutual capacitance of a plurality of the conductive traces.

In another embodiment, an attractive electrostatic force on a fingertip is created when the fingertip touches the touchscreen, by charging at least one of the conductive islands that is close to the fingertip, via a capacitive coupling of the at least one conductive island to at least one conductive trace that is in proximity to the at least one conductive island.

In another embodiment, the attractive electrostatic force on a fingertip is diminished, by a reduction in the charge on at least one conductive island that is close to the fingertip, via a capacitive coupling of the at least one conductive island to a second conductive trace that also is in proximity to the at least one conductive island.

In another embodiment, conductive traces pass through an array of the conductive islands in a zigzag pattern.

It is to be understood that both the foregoing general description and the following detailed description are exemplary and provided for purposes of explanation only, and are not restrictive of the subject matter claimed. The terms finger and fingertip are used interchangeably herein to refer to a portion of a user's body that may engage or contact a touchscreen and it will be appreciated that they are used generically to represent any portion of a user's body. Further features and objects of the present disclosure will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

It should be understood that the drawings are not to scale. While some details of a touchscreen device, including details of fastening means and other plan and section views of the particular components, have not been included, such details are considered to be within the comprehension of those of skill in the art in light of the present disclosure. It also should be understood that the present invention is not limited to the example embodiments illustrated.

DETAILED DESCRIPTION

The present disclosure generally provides touchscreens having a front surface and a plurality of conductive islands positioned at a depth that is in close proximity to the front surface, and wherein the conductive islands are substantially electrically isolated from one another.

Figure 1A:
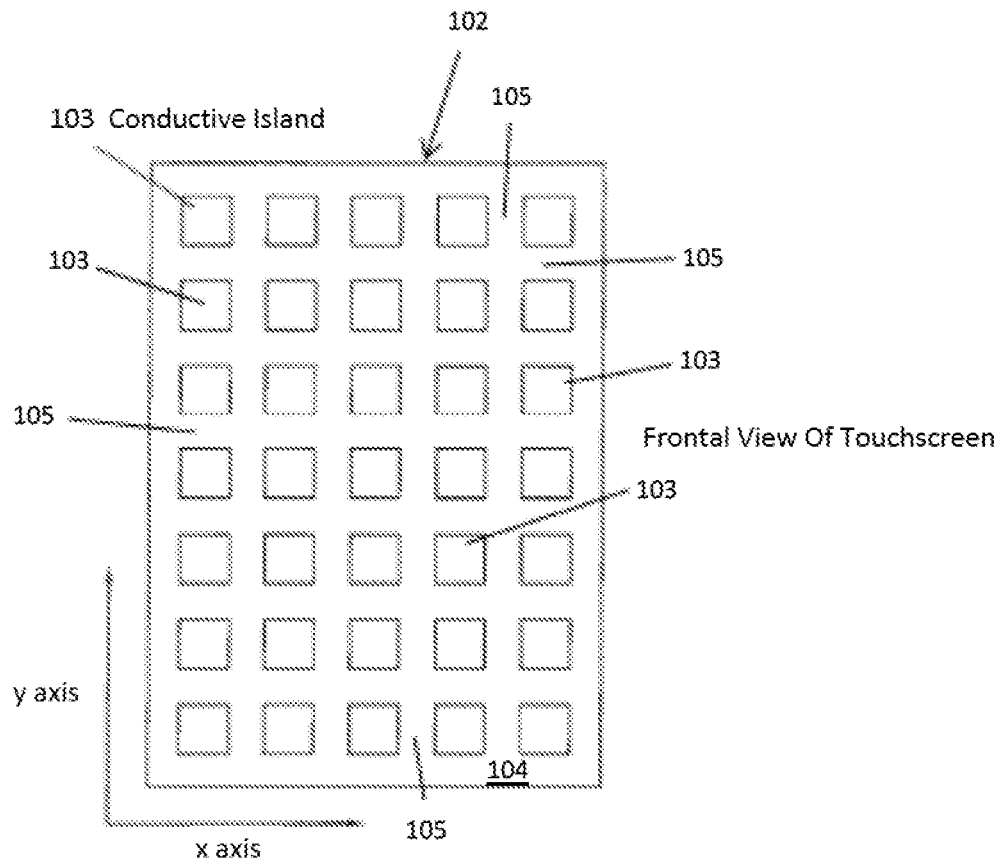
FIG. 1A shows a frontal view of a touchscreen having conductive islands.
Figure 1B:
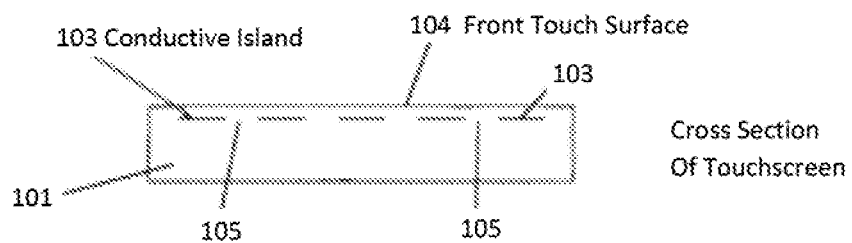
FIG. 1B shows a cross-sectional view of a the touchscreen in FIG. 1A.

FIG. 1A shows a frontal view of a touchscreen 102 that includes a substrate 101. FIG. 1B shows a cross-sectional view of the touchscreen 102. In one embodiment, the depth of conductive islands 103 within the touchscreen is such that they are in close proximity to the front (touched) surface 104 of the touchscreen 102, at a depth of Sum from the front surface 104 of the touchscreen 102. Conductive islands 103 are composed of deposited ITO of a thickness that results in a resistivity of 500 ohms/square, to permit good optical transparency. In this example, each conductive island is 5 mm square and in a square array having axes called x and y. Each conductive island 103 is electrically isolated from other conductive islands 103. Also, each conductive island 103 is separated from its neighboring conductive islands 103 by laser ablation lines 105 each 100 um wide, cut through the deposited ITO layer. Most of the area of the substrate 101 of the touchscreen 102 is covered by conductive islands 103, leaving only minimal ablation lines 105 between conductive islands, as necessary for their electrical isolation one from another. For graphical clarity, FIG. 1B exaggerates the depth of the conductive islands below the front surface 104 of the touchscreen 102, and the interval and spacing of ablation lines 105 between neighboring conductive islands.

Figure 2A:
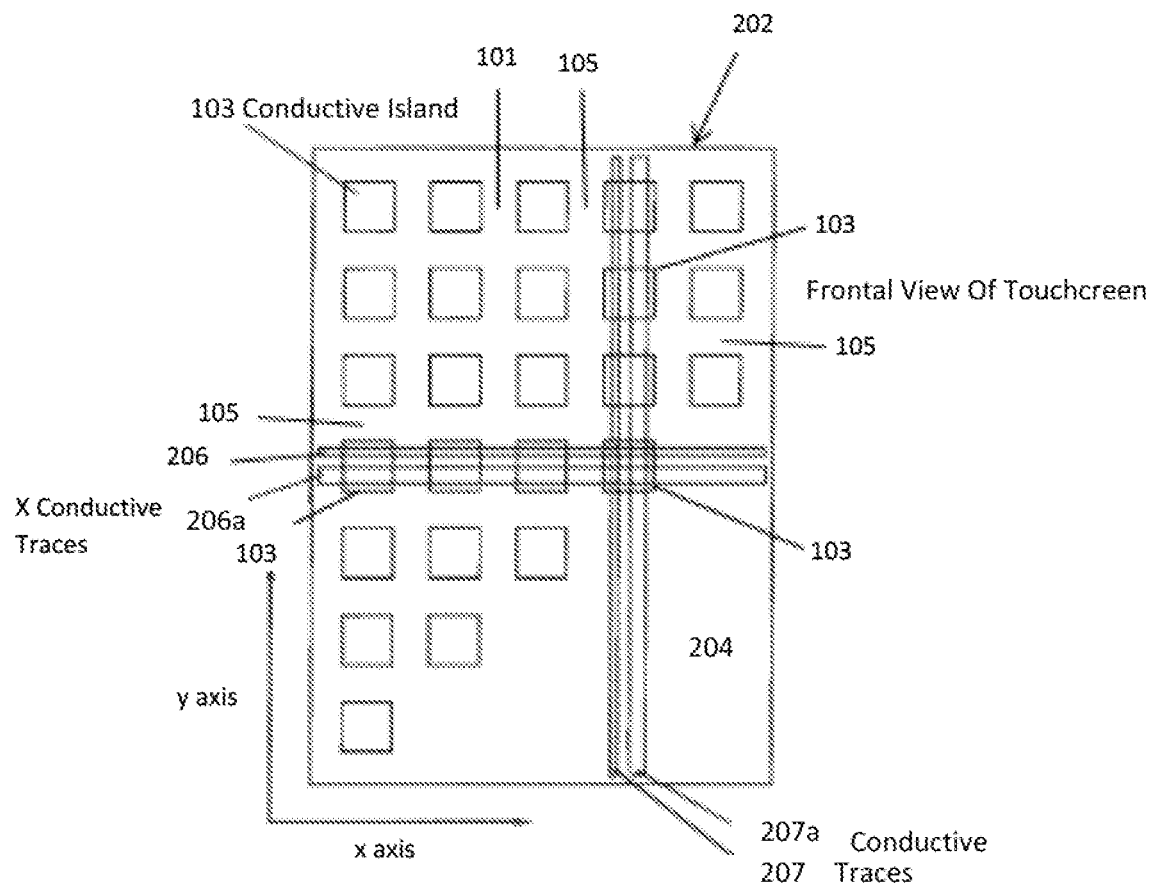
FIG. 2A shows a frontal view of a touchscreen including representative conductive traces that are substantially capacitively coupled to respective conductive islands.

In one embodiment disclosed in FIG. 2A, two conductive traces or pads 206, 206a, 207, 207a are capacitively coupled to a common conductive island 103 that is positioned such that it is in proximity to both traces or pads, overlapping them. The conductive island 103 serves to create a mutual capacitance between the two traces or pads 206, 206a, 207, 207a, and this mutual capacitance does not require electric field lines to project or arc out of and above the touchscreen. A user's fingertip, in proximity to the common island 103, increases the self-capacitance of the island 103, and by this mechanism decreases the mutual capacitance of the two traces or pads 206, 206a, 207, 207a.

The conductive islands 103 serve to mediate the capacitive interaction between a user's fingertips as they approach or contact the touchscreen front surface 104, with conductive traces that are within the touchscreen. The configuration of these conductive traces 206, 206a, 207, 207a will be explained herein. In surface capacitive sensing applications, conductive traces or pads 206, 206a, 207, 207a individually capacitively couple to fingertips, causing the self-capacitance of the traces or pads 206, 206a, 207, 207a to increase when a fingertip is in proximity to the trace or pad. This self-capacitance is measured electronically to detect proximity of a fingertip. In projected capacitance (P-cap) sensing applications, two conductive traces or pads 206, 206a, 207, 207a capacitively couple one to the other, with the electric field lines that couple the two traces or pads 206, 206a, 207, 207a projecting or arcing out of and above the touchscreen, where they may intersect a user's fingertip if it is in proximity. The mutual capacitance of two traces or pads i206, 206a, 207, 207a s measured electronically. A user's fingertip, by intersecting the projected electric field lines, may serve to increase or to decrease the mutual capacitance, and thus the fingertip may be detected.

Utilizing the physical mechanism discussed above by which a proximate fingertip modifies the mutual capacitance of two traces or pads produces superior touch location results. In projected capacitance sensing, the lines of electric field that couple two traces or pads arc out of the touch surface and are intercepted by a proximate fingertip. For the touchscreen depicted in FIG. 1A, the lines of electric field that couple two traces or pads 206, 206a, 207, 207a are interior to the touch surface and are not directly affected by a proximate finger Instead, a proximate finger modifies the self-capacitance of the conductive island 103 that couples the two traces or pads 206, 206a, 207, 207a. In the present invention, the electronic measurement needed is to measure the mutual capacitance of two traces or pads 206, 206a, 207, 207a. Measurements of mutual capacitance are beneficial because they are well suited to multiplexing.

Figure 2B:
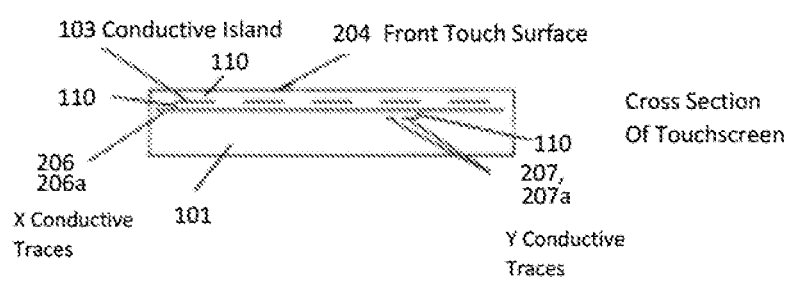
FIG. 2B shows a cross-sectional view of the touch screen of FIG. 2A.

Conductive traces 206, 206a, 207, 207a may be relatively narrow conductive traces 206, 207 such as of width 250 um, and/or relatively wide conductive traces 206a, 207a such as of width 2.5 mm. The conductive traces will be below the conductive islands 103 as shown in FIG. 2B, farther from the touched front surface 204. In another embodiment, the conductive traces 206, 206a, 207, 207a may be positioned above the conductive islands.

Other embodiments may differ without departing from the scope of the invention. For instance, the conductive islands 103 may be at a greater or lesser depth from the front surface 104 of the touchscreen 102, and need not all be at the same depth. The resistivity of the conductive islands 103 may be greater or less than 500 ohms/square. The conductive islands 103 may be composed of a material other than ITO, and may be placed and patterned by other means than by evaporative deposition and laser ablation. The size of the conductive islands may be other than 5 mm, and the shape may be a shape other than square. The shape of the conductive islands may be a simple shape such as a polygon or may be of a complex shape, even a non-convex shape or a shape consisting of a plurality of electrically connected parts. Moreover, the conductive islands need not all have the same shape, size, thickness, depth, resistivity, composition, or resistivity. The conductive islands may cover all, or almost all, or significantly less than all, of the surface of the substrate 101 and thereby of the respective touchscreen 102. Conductive islands at different depths may overlap, or partially overlap, or not overlap.

In another embodiment, the conductive islands are not strictly isolated electrically from one another, but rather are of such a conductivity, and interrogation is performed at such a frequency, that the conductive communication from one to another is limited in range, or falls off strongly with increasing distance. In this way, even a uniform sheet of conductive material such as ITO, could be considered to be composed of islands, since patches of ITO are effectively substantially electrically isolated from one another.

Referring to FIGS. 2A, 2B, 3A, 3B, 4A and 4B each conductive trace 106, 106a, 107, 107a, 206, 206a, 207, 207a, 306, 306a, 307, 307a, 406, 406a, 407 and 407a are each significantly capacitively coupled to each of the conductive islands 103 with which it comes into proximity. The extent of the capacitive coupling may be larger or smaller depending upon the amount of overlap in area between the conductive island 103 and the conductive trace 106, 106a, 107, 107a, 206, 206a, 207, 207a, 306, 306a, 307, 307a, 406, 406a, 407 and 407a, the distance perpendicular to the touchscreen front surface 104, 204, 304 or 404 between them, and the dielectric constant of the material or materials between them. Thus, the mutual capacitance of a conductive trace 106, 106a, 107, 107a, 206, 206a, 207, 207a, 306, 306a, 307, 307a, 406, 406a, 407 and 407a and conductive island 103 that are in proximity to one another may have a value in the range of a few picofarad (pF) to a few nanofarad (nF). Both larger and smaller values of the mutual capacitance have utility in the invention, as will be described.

Figure 2C:
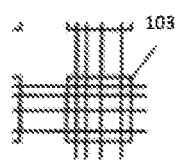
FIG. 2C is a close up schematic illustration of a frontal view of one of the conductive islands shown in FIG. 2A.

FIG. 2C is a close up schematic illustration of a frontal view of one of the conductive islands where there are four conductive traces 206, 206a, 207, 207a substantially capacitively coupled to each conductive island 103 within a row. For clarity in FIG. 2C, only the conductive traces associated with one conductive island 103 are shown. The conductive traces 206, 206a, 207, 207a are made of ITO of relatively low resistivity, such as 50 ohms per square, to achieve good electrical conductivity. Each conductive trace runs parallel to an axis (x or y) and comes into proximity with each conductive island along one line of conductive islands arrayed parallel to that axis. Thus, there may be relatively narrow X conductive traces 206, relatively wide X conductive traces 206a, relatively narrow Y conductive traces 207 and/or relatively wide Y conductive traces 207a.

Other embodiments may differ without departing from the scope of the invention. There may be fewer or greater than four conductive traces that are substantially capacitively coupled to each conductive island. Some such variations will be detailed herein. The conductive traces 206, 206a, 207, 207a may be composed of ITO or another material, may be deposited by evaporation or other techniques, and may be patterned by laser ablation or other techniques. The depth of the layers of conductive traces 206, 206a, 207, 207a may be greater or less than the previous example figures provided. The material and thickness of the glass substrate 101 may be different. The resistivity of the conductive traces 206, 206a, 207, 207a may be greater or less than 50 ohms per square. Many patterns and routes may be used for the conductive traces. Also, conductive traces 206, 206a, 207, 207a may come into proximity to different subsets of the conductive islands depending upon the route of each conductive trace.

Electrically insulating layers 110 are interposed between conductive islands 103 and conductive traces 206, 206a, 207, 207a, and between conductive traces 206, 206a, 207, 207a and other conductive traces 206, 206a, 207, 207a at least where these cross one another. It will be appreciated that there are many known insulating materials and methods of creating them that can be applied in implementing the present invention. These materials and methods will not be reviewed here and will be understood to reside in the spaces between the respective conductive islands and conductive traces. Some of these methods make it possible for conductive traces to reside on the same ITO layer, that is, at the same depth below the front surface 204 of the touchscreen 202, and yet cross over each other without contacting each other, by way of various kinds of bridges that are known in the art.

Figure 3A:
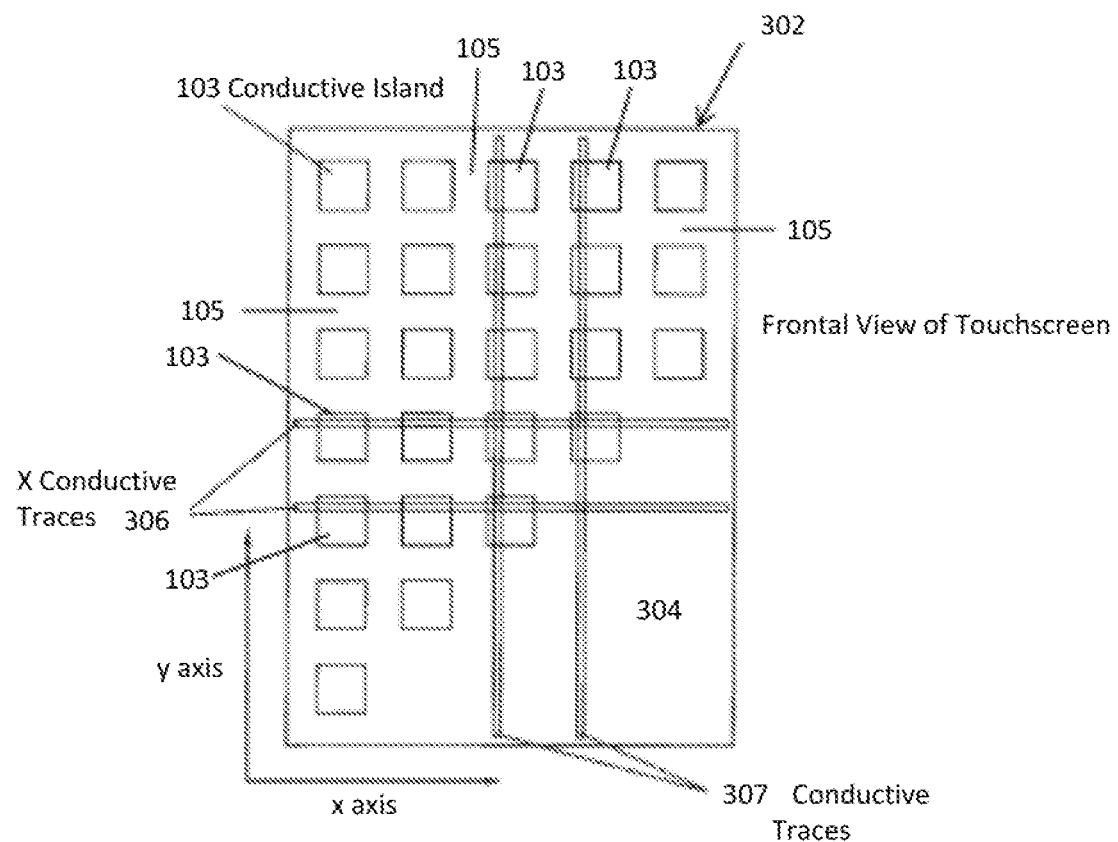
FIG. 3A shows a frontal view of a touchscreen having conductive islands and representative conductive traces that are substantially capacitively coupled to respective conductive islands and wherein some of the conductive traces cross paths.
Figure 3B:
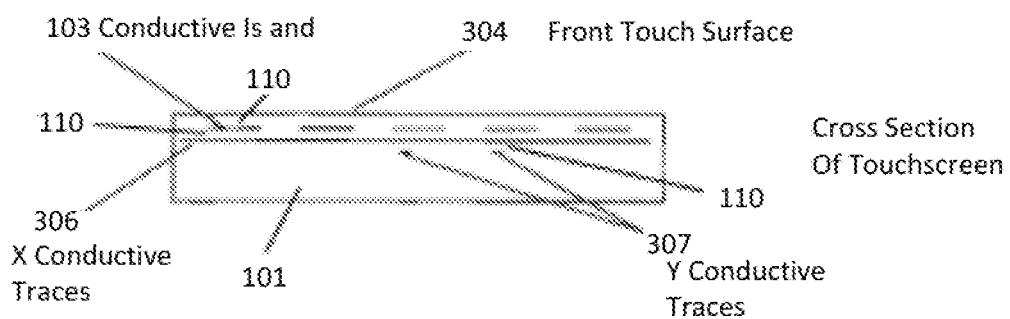
FIG. 3B shows a cross-sectional view of the touch screen of FIG. 3A.

FIGS. 3A and 3B depict another embodiment of a touchscreen 302 having a front surface 304. In the touchscreen 302, there are but two relatively narrow conductive traces 306, 307 that come into proximity to each conductive island 103. Here too for clarity, only some of the conductive traces 306, 307 and conductive islands 103 are shown. X conductive traces 306 lay at a depth of 5 um below the conductive islands 103. Y conductive traces 307 lay at a depth of 7 um below the conductive islands. The X and Y conductive traces 306, 307 are composed of ITO having a resistivity of 50 ohms per square. The touchscreen substrate 101 is glass with a thickness of 0.5 mm, upon which the layers of ITO described above are deposited and patterned, with intervening layers of silicon dioxide as an insulator, and also a top layer of silicon dioxide as an insulator above the conductive island layer of ITO (represented by the gaps between the respective elements and surfaces).

The X and Y conductive traces 306, 307 are patterned by laser ablation, forming an intersecting network of relatively narrow conductive traces 306, 307, parallel to the respective x and y axes, as shown. The crossover points between an X and a Y conductive trace 306, 307 do not cause an electrical connection between the conductive traces 306, 307, because the lines are on different ITO layers separated by an insulator. The conductive traces 306, 307 are brought out to edge connectors in any of numerous ways that are known in the art. In this embodiment, the mutual capacitance from an X or Y conductive trace 306, 307 to a conductive island 103 is relatively small, because the small width of the conductive traces 306, 307 creates a small area of overlap between a conductive trace 306, 307 and a conductive island 103.

Figure 4A:
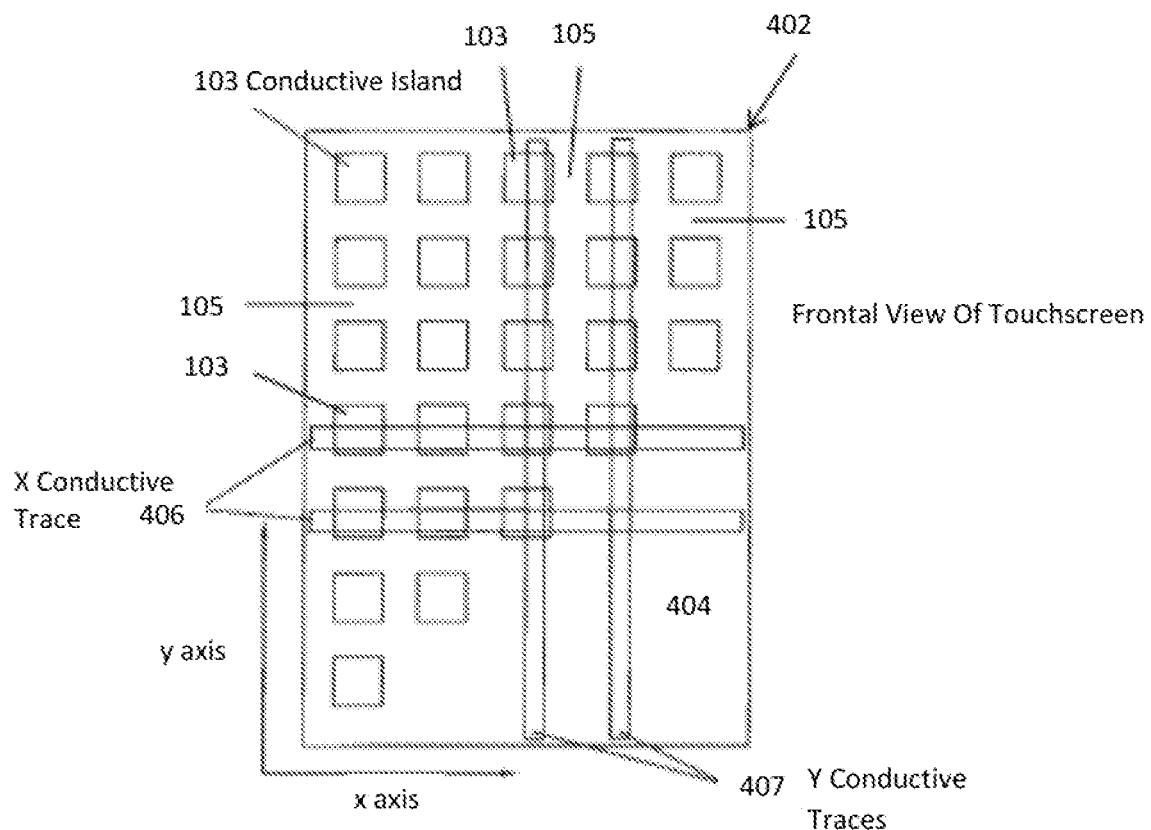
FIG. 4A shows a frontal view of a touchscreen having conductive islands and representative conductive traces that are substantially capacitively coupled to respective conductive islands and wherein some of the conductive traces cross paths.
Figure 4B:
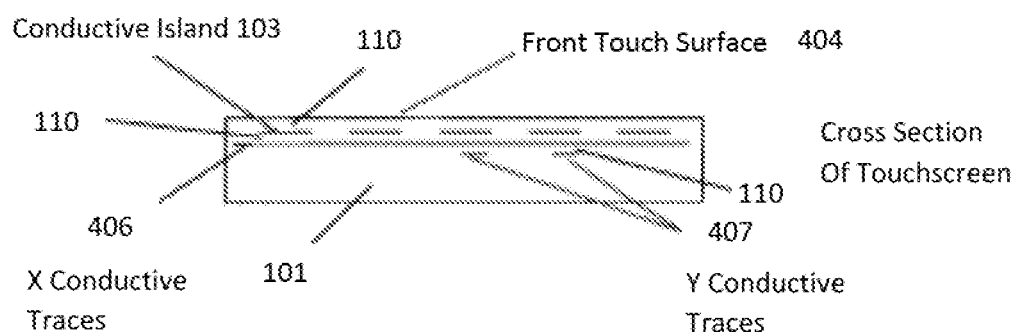
FIG. 4B shows a cross-sectional view of the touch screen of FIG. 4A.

FIGS. 4A and 4B depict another embodiment of a touchscreen 402 for use as a surface haptic display rather than for capacitive sensing. The X and Y conductive traces 406, 407 are relatively wide, such that the overlap area of a conductive trace 406, 407 with a conductive island 103 is relatively large. In this embodiment, the mutual capacitance from an X or Y conductive trace 406, 407 to a conductive island 103 is relatively large.

Although the relatively large capacitance from an X or Y conductive trace 406, 407, to a conductive island 103 is optimal for haptic display, this does not preclude the same conductive traces 406, 407 also being used for capacitive sensing. In some situations, it may be desirable to employ fewer overall conductive traces 406, 407, and therefore, to reuse some or all of the same conductive traces 406, 407 both for haptic display and for capacitive sensing. In other situations, it may be desirable to use separate conductive traces 406, 407 for the functions of haptic display and of capacitive sensing. In general, some conductive traces 406, 407 can serve both in a capacitive sensing role and in a haptic display role, and other conductive traces 406, 407 can serve solely for capacitive sensing or for haptic display.

For clarity, the touchscreen 202 combines touchscreens 302 and 402. Consistent with this embodiment, each conductive island 103 is significantly capacitively coupled to four conductive traces 206, 206a, 207, 207a. Two of the conductive traces are used for capacitive sensing of finger position and two of the conductive traces are used for haptic display. A connection pattern in which a plurality of conductive traces 206a, 206, 207a, 207 are electrically connected as one may be of value by allowing a finer scale of electrical activation for haptics, or electrical sensing for finger position sensing, without increasing the number of channels of electronics that is needed.

Figure 5A:
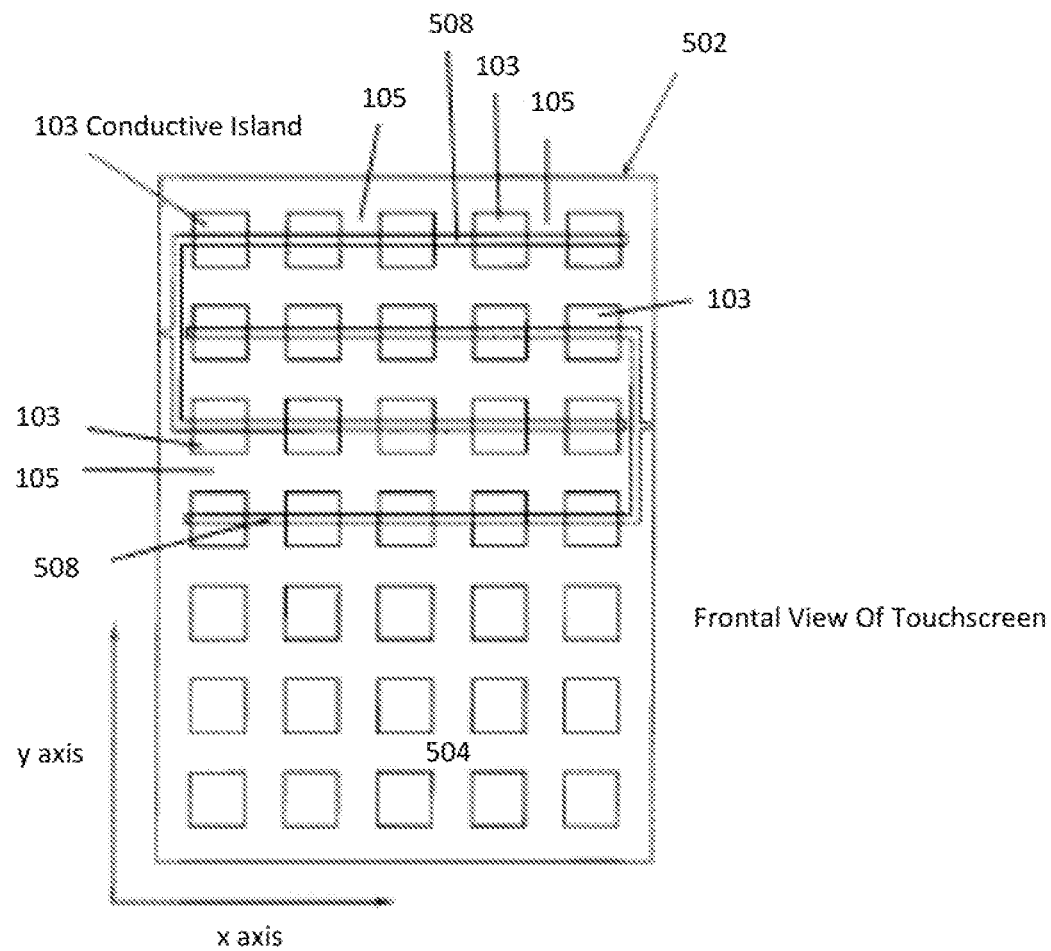
FIG. 5A shows a frontal view of a touchscreen having conductive islands and alternative representative conductive traces that are substantially capacitively coupled to respective conductive islands.
Figure 5B:
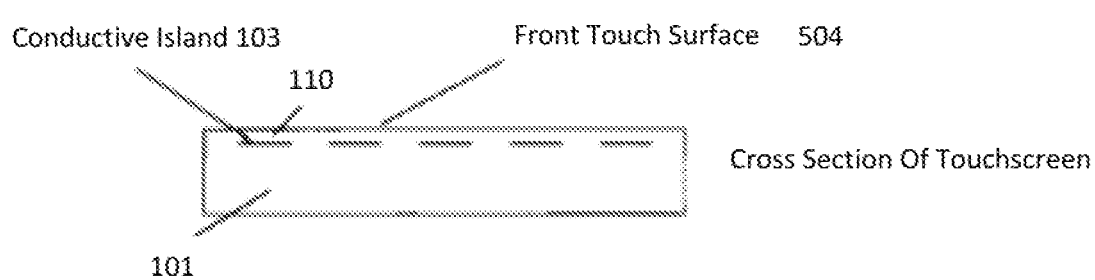
FIG. 5B shows a cross-sectional view of the touch screen of FIG. 5A.

FIGS. 5A and 5B depict another embodiment of a touchscreen 502. The conductive traces are spaced at 2 mm intervals, with alternate conductive traces 508 directed to opposite edges of the substrate 101 for their connection to electronics, such as a controller, microprocessor, Application Specific Integrated Circuit (ASIC), or the like, that serve to locate finger contacts by capacitive sensing or that may create haptic actuation signals, or a combination of both. By twos, conductive traces 508 are electrically connected as one, by a connection that occurs near the edges. The conductive traces 508 are thus interdigitated by pairs.

Figure 5C:
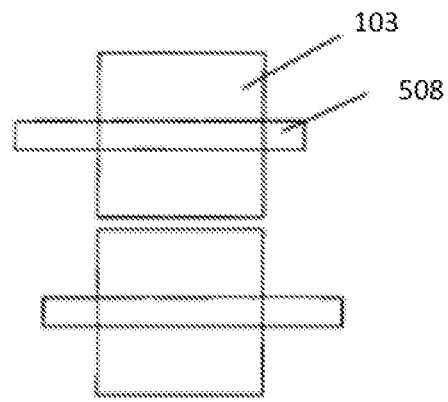
FIGS. 5C and 5D show close up schematic illustrations of a frontal view of relatively larger conductive islands from FIG. 5A that are substantially capacitively coupled to the alternative conductive traces, and a frontal view of relatively smaller conductive islands that are substantially capacitively coupled to still further alternative conductive traces.
Figure 5D:
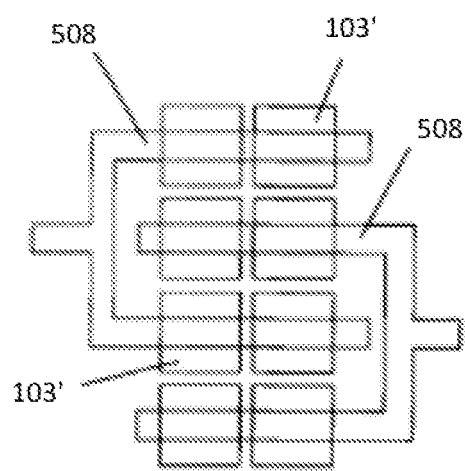

FIGS. 5C and 5D show still more clearly that a smaller number of larger conductive islands 103 may be replaced with a larger number of smaller conductive islands 103', maintaining the interdigitated pattern but now at reduced scale, and with no increase in the number of conductive traces 508 that are needed to capacitively couple to the conductive islands. In FIGS. 5C and 5D, there are initially two conductive islands 103, which are then subdivided each into four smaller conductive islands 103'. By combining conductive traces 508 by twos, still only two conductive traces 508 are needed.

In other embodiments, other numbers of adjacent or non-adjacent conductive traces 508, such as three or more, may be connected as one. The connected conductive traces 508 may be interdigitated or not. The electrical connection that connects a plurality of conductive traces 508 together as one, may be made: by connections on the substrate 101 itself as in the preferred embodiment, may be made of ITO or another conductor, or may be made by connections within an edge connector to the substrate 101, or within a cable such as a ribbon cable or flex PCB from the edge connector to electronics, or within the electronics, for instance on a printed circuit board. The electrical connection that connects a plurality of conductive traces 508 together as one also may be made through a capacitive rather than resistive connection, as will be explained next.

Touch screens often have one or two patterned layers of ITO and these are covered in insulating layers, and have insulating layers between them. To make electrical connection to a conductive trace 508 on a layer of ITO, some part of the ITO is left exposed and uninsulated, not covered with insulator. These exposed portions are directly connected conductively, often by a multi-conductor ribbon cable or flexible PCB, to electronics. Often a conductive metallization layer is deposited on the exposed ITO for protection and to facilitate electrical contact. In some embodiments of the present invention, more layers of ITO are called into use than the one or two layers that are typically used at present. To arrange uninsulated exposures to many layers may be undesirable.

Figure 6A:
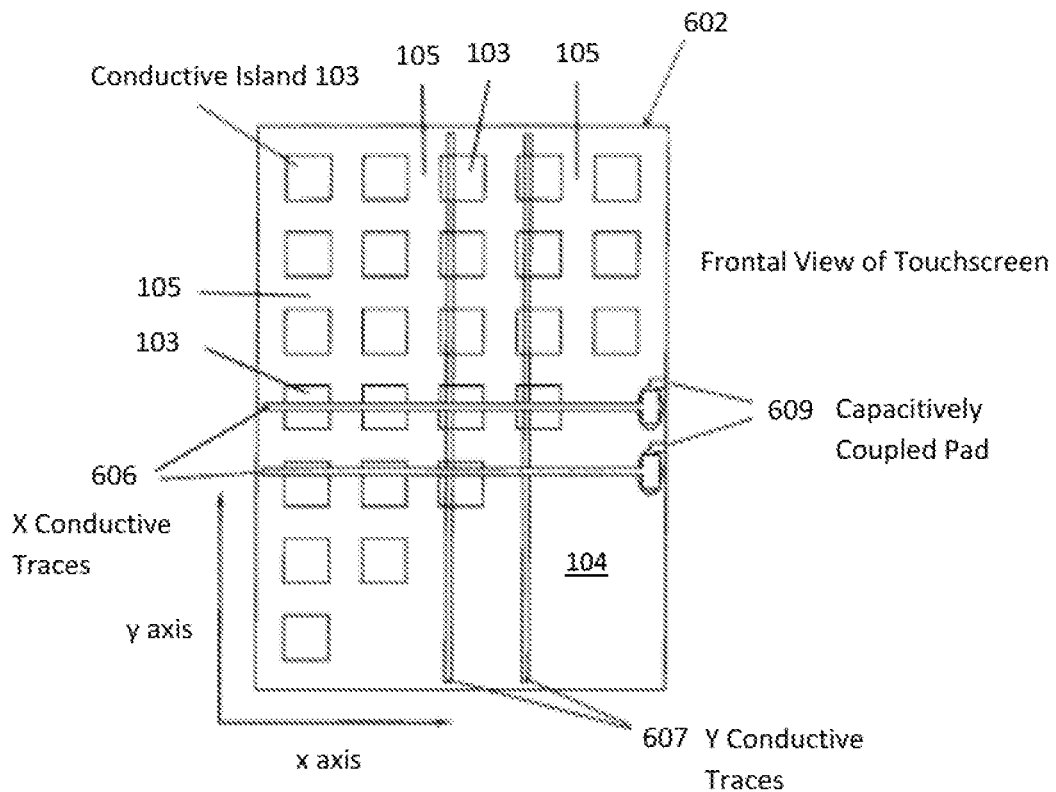
FIG. 6A shows a frontal view of a touchscreen having conductive islands and representative conductive traces that are substantially capacitively coupled to respective conductive islands and wherein some of the conductive traces cross paths and are capacitively coupled to conductive pads on the exterior surface of the substrate of the touchscreen.
Figure 6B:
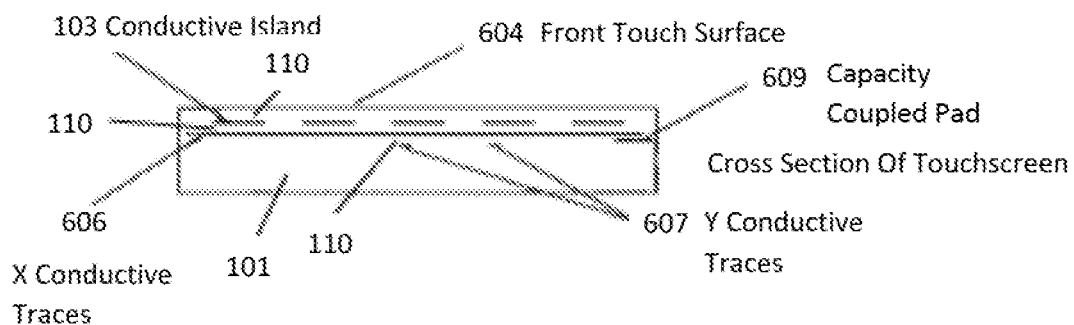
FIG. 6B shows a cross-sectional view of the touch screen of FIG. 6A.

FIGS. 6A and 6B depict another embodiment of a touchscreen 602 having a front surface 604, an X conductive trace 606 is brought to electrical connection with electronics, not by a direct conductive connection to ITO on the layer that contains the conductive trace 606, 607, but instead by a capacitive coupling from that conductive trace 606, 607 to a conductive trace 606, 607 on another layer within the substrate 101 of the touchscreen 602. The dimensions of the example capacitor forming the capacitive coupling are 4 mm by 2 mm, and the layers are separated by an insulating layer of silicon dioxide 5 um in thickness.

In other embodiments, the capacitive coupling may be not to another conductive layer within the substrate 101, but rather to a conductive pad 609 on an exterior surface of the substrate. This conductive pad 609 could be conductive paint or ink or metallization, or any of the various methods of applying a conductive pad 609 that are known in the art.

Any number of the conductive traces 606, 607 may be connected capacitively as described, not only an X conductive trace 606, but also a Y conductive trace 607. The dimensions of the capacitor forming the capacitive coupling may be greater or smaller than 4 mm by 2 mm, and the layers may be separated by an insulating layer of silicon dioxide greater or smaller than 5 um in thickness. The insulating layer also may be a material other than silicon dioxide, for example, a material with a higher dielectric constant may be desirable.

The conductive island 103 that is substantially capacitively coupled to both of two conductive traces (for instance one X conductive trace 606 and one Y conductive trace 607), causes a mutual capacitance of the two conductive traces. The mutual capacitance is diminished if a user's fingertip is close to the conductive island. In a another embodiment, there are twenty (20) X conductive traces 606 parallel to the x axis ("X conductive traces") and twelve (12) Y conductive traces 607 parallel to the axis ("Y conductive traces")

Figure 7:
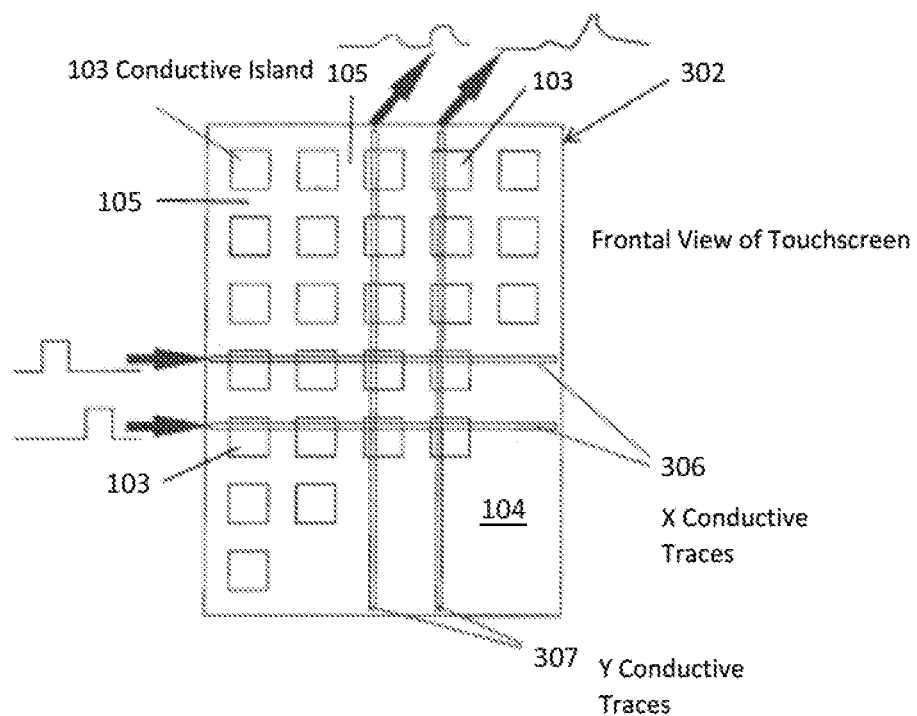
FIG. 7 shows a frontal view of a touchscreen having conductive islands and representative conductive traces that are substantially capacitively coupled to respective conductive islands and wherein some of the conductive traces cross paths, and further representing that the respective X conductive traces may be energized with a square wave pulse and that the Y conductive traces receive a charge from the X conductive traces.

FIG. 7 depicts another embodiment of the touchscreen of FIG. 3A. As illustrated in FIG. 7, the X conductive traces 306 are energized sequentially with a square wave pulse of duration 1 uS and amplitude 3.3 volts. The Y conductive traces 307 are monitored electrically as each receives an amount of charge from the energized X conductive trace 306. The charge is conveyed substantially via the conductive island 103 that is common to the X conductive trace 306 and the Y conductive trace 307, and additionally via various parasitic couplings which do not concern us. To the extent a user's fingertip is dose to a conductive island 103, the conveyance of charge from the X conductive trace 306 associated with that conductive island, to the Y conductive trace 307 associated with that conductive island, is diminished. By determining the charge conveyed from each X conductive trace 306 to each Y conductive trace 307, the conveyance of charge at every (x, y) intersection is determined: Two hundred and forty (240) such intersections are present in this embodiment. Each of the respective conveyance values, to the extent reduced from a normal value, indicates the extent to which a user's fingertip is near that intersection.

The 1 uS square wave pulses may be applied at a rate of five hundred thousand (500,000) per second, thus scanning the whole touchscreen twenty-five thousand (25,000) times per second. One thousand (1000) consecutive scans may be averaged to obtain a measure that is relatively immune to noise. Thus, the location of all fingers in contact or near the screen can be established twenty-five (25) times per second.

Because of the use of conductive islands 103 to mediate the capacitive interaction of conductive traces 306, 307 with each other and with a user's finger identification of a touch location is greatly improved. Much of the electronic methods for driving and reading conductive traces 306, 307 especially with low power consumption, patterns for the conductive traces 306, 307, and algorithms for best interpreting the measurements especially in the presence of noise that have been invented for P-cap touch sensing can be applied to the present invention, either directly or with minor modification. However, the prior art P-cap sensing uses electrodes near the rear surface. The present disclosure's use of electrodes near the front surface is important to allow haptic actuation with reasonable actuation voltages.

Other embodiments may differ from the embodiment described herein. Other numbers of conductive traces 306, 307 besides twelve (12) and twenty (20) may be used, as well as other patterns besides the x-y grid. Other pulse shapes, durations, and repetition rates may be used. Other numbers of consecutive scans may be averaged for noise reduction, and other methods of noise reduction that are known in the art may be used. Other rates of scan of the entire touchscreen may be achieved, either more or fewer completed scans per second than 25. Partial scans may be used, or adaptive changes in the rate of scans, in ways known in the art.

Other quantities besides the charge transferred may be used to determine finger positions, that reflect the mutual capacitance between two conductive traces coupled to a conductive island. Methods are known in the art to minimize power consumed, avoid noise, best identify fingers, and to accomplish many other desirable goals in P-cap, and these methods may be adapted to the present invention. However, as noted above, near front surface placement of electrodes is advantageous.

A user's fingertip can be electrostatically attracted toward the front surface 104 of the touchscreen 102 by a difference of potential between the fingertip and a conductive island 103 within the substrate 101, as we above described. It may be desirable to have, beneath the area of one fingertip on the substrate 101, two or more conductive islands 103, with some of the conductive islands 103 charged to a positive potential relative to that of the fingertip, and others negative. If the area of a fingertip (typically 1 square cm) is large compared to the area of a conductive island 103, then there may be many conductive islands within the area of a fingertip. The present invention allows us to charge some of the conductive islands positive and some negative.

Figure 8A:
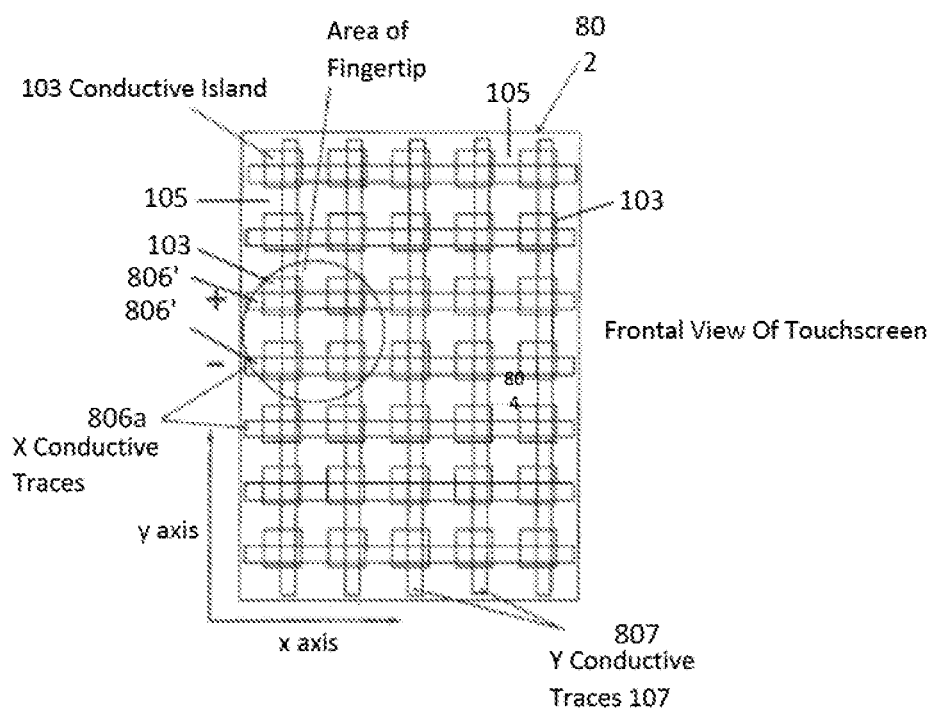
FIG. 8A shows a schematic illustration of a frontal view of another example touchscreen having conductive islands and representative conductive traces that are substantially capacitively coupled to respective conductive islands and wherein some of the conductive traces cross path and having some negative charged conductive traces and other positive charged conductive traces.

In one embodiment, there are four conductive traces 206, 206a, 207, 207a in proximity to each conductive island 103, as shown in FIG. 2A. By way of example, let us suppose that in a typical situation there are four conductive islands 103 on the substrate 101 under a fingertip that is in contact with the front surface 204 of the touchscreen 202, although there could be more or fewer depending on the size and exact location of the fingertip, and the size of the conductive islands 103. FIG. 8A illustrates this example, showing however only the conductive traces 806, 807 used for haptic display actuation. Then, in order to charge some of the conductive islands 103 under the fingertip positive with respect to the fingertip, and others negative, one X conductive trace 806a' can be changed to positive and one X conductive trace 806a" to negative. This leaves two of the conductive islands 103 under the fingertip positive and two negative. In this embodiment there is no need to involve any Y conductive traces 807.

Many variations are possible within the scope of the invention. For instance, above, the Y conductive traces 807 could be used in place of the X conductive traces 806, 806a', 806" for the purpose of making each conductive island electrostatically attractive. Either the X or the Y conductive traces 806, 806a', 806", 807 could be eliminated. Other conductive trace patterns could be used, not just aligned with the x and y axes. The number of conductive traces 806, 806a', 806", 807 that are charged in order to make a conductive island 103 electrostatically attractive to a fingertip could be not one, but two, or even more if there are more conductive traces 806, 806a', 806", 807 that are substantially capacitively coupled to each conductive island 103, in some conductive trace patterns.

For a touchscreen presenting a multi-haptic display, there often will be more than one fingertip in contact with the front surface 804 of the touchscreen 802. It could be that two fingertips fail on a common conductive trace 806, 806a', 806", 807, and yet it may be desired to present different haptic sensations to the two fingertips. In the above preferred embodiment, with X conductive traces 806, 806a', 806" driven in order to charge the conductive islands 103 associated with them, it would appear not to be possible to produce different haptic sensations to different fingers both lying over the same X conductive trace 806, 806a', 806".

Figure 8B:
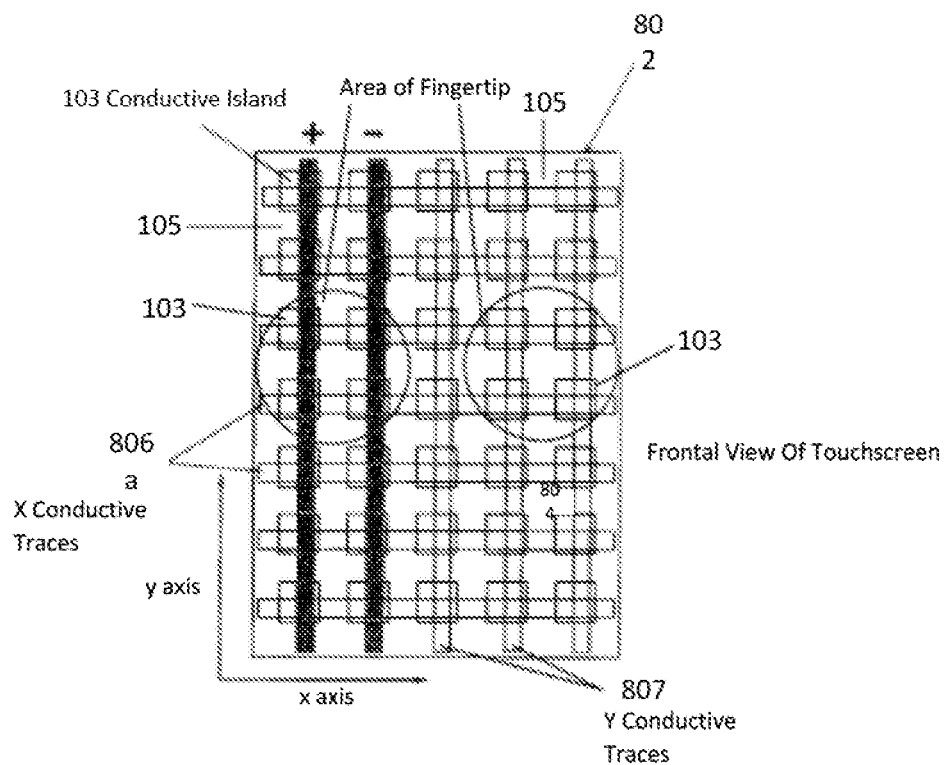
FIG. 8B shows another embodiment of the touchscreen of FIG. 8A with an alternative method of charging some of the conductive traces to present different haptic sensations to two fingers.

FIG. 8B shows another embodiment of the touchscreen of FIG. 8A with an alternative way of charging some of the conductive traces 806, 806a', 806", 807 to present different haptic sensations to two fingers. One method to present different haptic sensations to the two fingers, is to charge the conductive islands using the Y conductive traces 807, rather than the X conductive traces 806a, 806a', 806" that have the unfortunate coincidence of two fingers. That is, we may choose to energize the necessary conductive islands, using either the X conductive traces 806a, 806a', 806" or the Y conductive traces 807 to convey charges to them, depending on which set of conductive traces 806a, 806a', 806", 807 avoids the problem of having two fingers on it that need different haptic sensations.

Another way to avoid identically charging the conductive islands under both fingers, and which provides a further preferred embodiment, is to make use of both the X and Y conductive traces 806a, 807. Suppose that the unfortunate coincidence of two fingers occurs on an X conductive trace 806a, and that one finger should be electrostatically attracted to the front surface 804 of the touchscreen 802 and the other finger not attracted. The X conductive trace 806a, 806a', 806a" may be charged positive, thus charging conductive islands 103 under both fingers, and the conductive island that is under the second finger may be reduced in attractive potential by applying a negative voltage to the Y conductive trace 807 that is in proximity to it and not in proximity to the conductive island 103 under the first finger. In this way conductive islands 103 under different fingers may be differently charged from one another, even if they lie over common conductive traces 806a, 806a', 806a", 807, by making use of the fact that each conductive island 103 is substantially capacitively coupled to more than one conductive trace 806a, 806a', 806a", 807. Thus, the attractive potential of a conductive island 103 can be controlled as a combination of the actions of several conductive traces 806a, 806a', 806a", 807.

Figure 9A:
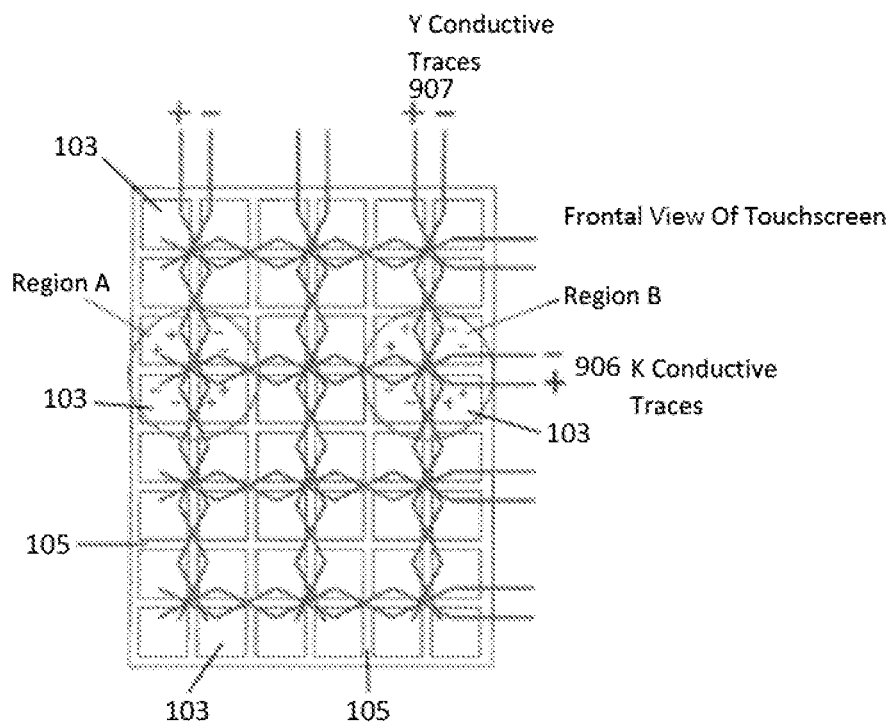
FIG. 9A shows a frontal view of a touchscreen having conductive islands and representative conductive traces that pass through the array of conductive islands in a zigzag pattern and that are substantially capacitively coupled to respective conductive islands, and further wherein some of the conductive traces cross paths and some charged conductive traces are charged negative and other conductive traces are charged positive.
Figure 9B:
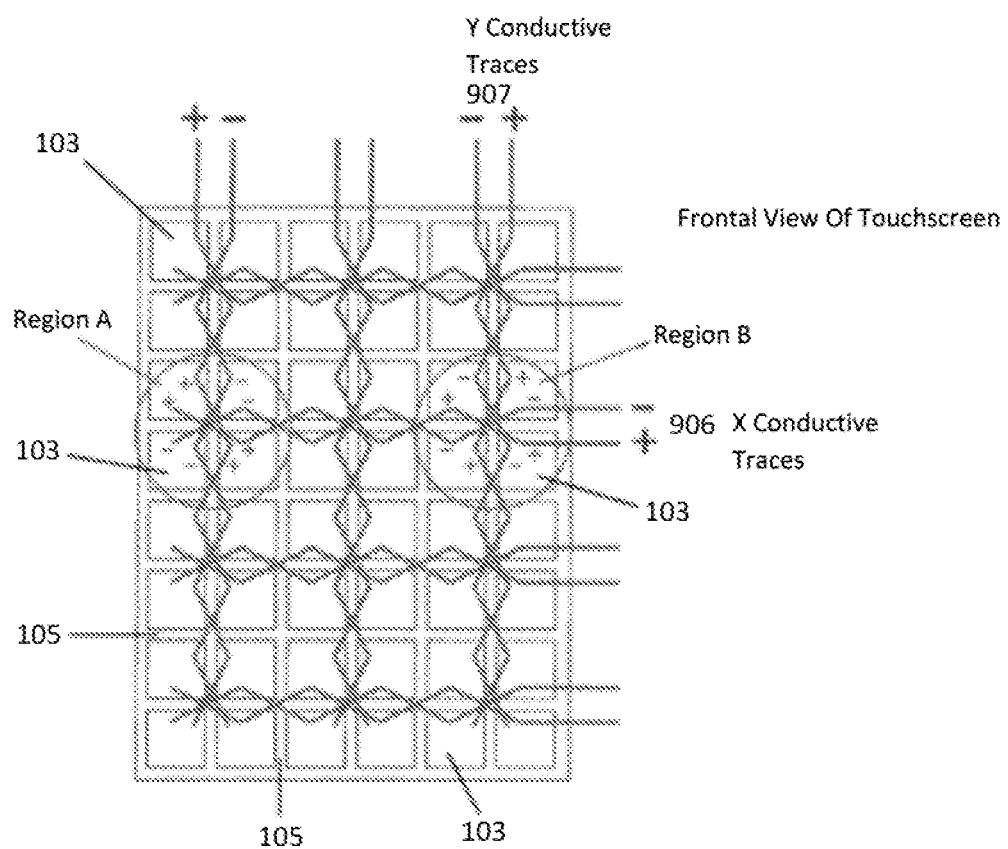
FIG. 9B shows another embodiment of the touchscreen of FIG. 9A with an alternative way of charging some of the conductive traces that would change the electrostatic attraction of the front surface of the touchscreen to a finger.

FIGS. 9A and 9B show another embodiment of a touchscreen 902. Here only conductive traces 906, 907 for haptic actuation are shown, not any conductive traces for finger position sensing. The latter also could be added, or the conductive traces for haptic actuation could serve the purpose of finger position sensing as well, as explained earlier conductive traces 906, 907 pass through the array of conductive islands 103 in a zigzag pattern. Both X and Y conductive traces 906, 907 are shown. The conductive traces 906, 907 are illustrated as relatively narrow, in order to better be able to see their continuity through the array of conductive islands 103 despite their frequent crossings.

In order to charge some conductive islands 103 positive and others nearby negative, alternate conductive traces 906, 907 may be given positive and negative potential. Region A may provide a strong electrostatic attraction to a finger by charging the traces 906, 907 that pass through region A as indicated. Each conductive island 103a finds itself substantially capacitively coupled to X and Y traces 906, 907, which are both positively charged, or both negatively charged. At the same time, region B also presents a strong electrostatic attraction to a second finger, as each conductive island 103 also is doubly charged positive or doubly charged negative.

FIG. 9B shows that the electrostatic attraction of region B may be eliminated while the electrostatic attraction of region A is maintained, simply by exchanging the polarities of two of the conductive traces 906, 907. Now in region B, each conductive island 103 finds itself substantially capacitively coupled to X and Y traces 906, 907 which are of opposite polarity of charge, and these cancel.

To summarize, the conductive islands 103, each carrying a charge that is a sum of that which is conveyed to it by an X trace 906 and by a Y trace 907, can therefore serve to allow the Y conductive traces 907 to enhance or cancel the effect of the X conductive traces 906.

It should be understood that in all of the foregoing, the polarities specified are showing the relative phase of the voltage of a given conductive trace or conductive island. In a preferred embodiment, the voltages all alternate rapidly.

Other patterns also may be used to implement the concept of the invention, which is to allow multiple conductive traces to cancel or to enhance the electrostatic attraction of conductive islands. Having shown that multiple conductive traces can enhance or cancel, it should be understood that any intermediate level of electrostatic attraction between these two cases also may be accomplished, as a linear combination of the activation patterns described.

Conductive traces can cross in any number of ways. Actual crossings can even be avoided: a zigzag pattern can be replaced by two connected parallel straight traces, varying in width as they pass in proximity to alternate conductive islands.

It will be appreciated that a touchscreen in accordance with the present disclosure may be provided in various configurations. Any variety of suitable materials of construction, configurations, shapes and sizes for the components and methods of connecting the components may be utilized to meet the particular needs and requirements of an end user. It will be apparent to those skilled in the art that various modifications can be made in the design and construction of such touchscreens without departing from the scope or spirit of the claimed subject matter, and that the claims are not limited to the preferred embodiments illustrated herein.

The invention claimed is:

1. A surface haptic display comprising:
   a front surface having a plurality of conductive islands disposed at a depth in close proximity to the front surface, and wherein each of the plurality of conductive islands are conductively isolated;
   a positive trace operatively connected to the surface haptic display, wherein the positive trace includes a plurality of first rows;
   a negative trace operatively connected to the surface haptic display, wherein the negative trace includes a plurality of second rows;
   wherein the plurality of first rows of the positive trace and the plurality of second rows of the negative trace are interdigitated;
   a control device configured to apply positive voltage signals to the positive trace and to apply negative voltage signals to the negative trace; and
   wherein an attractive electrostatic force is generated on a fingertip contiguous with the front surface that increases a perceived friction force on the fingertip against movement of the fingertip parallel to the front surface when at least one of the conductive islands disposed in an area under the fingertip is charged via a capacitive coupling to the positive trace, and at least another of the adjacent conductive islands disposed in the area under the fingertip is charged via capacitive coupling to the negative trace.

2. The surface haptic display of claim 1, wherein a capacitive coupling connects the plurality of first rows of the positive trace.

3. The surface haptic display of claim 1, wherein a capacitive coupling connects the plurality of second rows of the negative trace.

4. The surface haptic display of claim 1, wherein the plurality of conductive islands are arranged in a pattern such that each of the plurality of conductive islands is adjacent to others of the plurality of conductive islands in both a first direction and in a second direction, wherein the first direction is substantially perpendicular to the second direction.

5. The surface haptic display of claim 1, wherein a first set of the plurality of conductive islands in the area under the fingertip is substantially capacitively coupled to the positive trace and a second set of the plurality of conductive islands in the area under the fingertip is substantially capacitively coupled to the negative trace, wherein one of the positive trace and negative trace substantially capacitively coupled to each of the respective one of the first set and second set of the plurality of conductive islands in the area under the fingertip is configured to transmit a signal to each of the respective one of the first set and second set of the plurality of conductive islands in the area under the fingertip and another of the positive trace and negative trace substantially capacitively coupled to each of the respective other of the first set and second set of the plurality of conductive islands in the area under the fingertip is configured to receive the signal from each of the respective other of the first set and second set of the plurality of conductive islands in the area under the fingertip.

6. The surface haptic display of claim 5, wherein a magnitude of the perceived friction force is relative to a duty cycle of one of a positive voltage signal and a negative voltage signal.

7. The surface haptic display of claim 5, wherein a touch location is determined by transmitting a signal from one of the positive trace and negative trace, and receiving the signal from another of the positive trace and negative trace.

8. The surface haptic display of claim 7, wherein a strength of the received signal is enhanced by the plurality of conductive islands in the area under the fingertip.

9. The surface haptic display of claim 5, wherein the mutual capacitance of the transmitting positive trace and the receiving negative trace is enhanced by the plurality of conductive islands in the area under the fingertip.

10. The surface haptic display of claim 1, wherein the positive trace and the negative trace are disposed below the plurality of conductive islands in the area under the fingertip.

11. A haptic device comprising:
    a surface haptic display comprising a front surface;
    a plurality of conductive islands disposed at a depth in close proximity to the front surface, and wherein each of the plurality of conductive islands are conductively isolated;
    a first conductive trace operatively connected to the surface haptic display, wherein the first conductive trace includes a plurality of first rows;
    a second conductive trace operatively connected to the surface haptic display, wherein the second conductive trace includes a plurality of second rows;
    wherein the plurality of first rows of the first conductive trace and the plurality of second rows of the second conductive trace are interdigitated;

a control device configured to apply positive voltage signals to one of the first conductive trace and the second conductive trace and to apply negative voltage signals to another of the first conductive trace and second conductive trace; and wherein an attractive electrostatic force is generated on a fingertip contiguous with the front surface that increases a perceived friction force on the fingertip against movement of the fingertip parallel to the front surface when at least one of the conductive islands that is disposed in an area under the fingertip is charged via a capacitive coupling to the first conductive trace and at least another of the conductive islands that is disposed in the area under the fingertip is charged via capacitive coupling to the second conductive trace.

12. The haptic device of claim 11, wherein a location of a fingertip in contact with the front surface is determined by measuring a decrease in a mutual capacitance of the first conductive trace and the second conductive trace each of which are substantially capacitively coupled to an adjacent pair of the plurality of conductive islands in the area under the fingertip.

13. The haptic device of claim 12, wherein the fingertip in proximity to an adjacent pair of the plurality of conductive islands in the area under the fingertip substantially capacitively coupled with the first conductive trace and the second conductive trace increases a self-capacitance of the adjacent pair of conductive islands in the area under the fingertip substantially capacitively coupled with each of the first conductive trace and second conductive trace and correspondingly decreases the mutual capacitance.

14. The surface haptic display of claim 11, wherein a capacitive coupling connects the plurality of first rows of the first conductive trace.

15. The surface haptic display of claim 11, wherein a capacitive coupling connects the plurality of second rows of the second conductive trace.

16. The surface haptic display of claim 11, wherein each of the first conductive trace and the second conductive trace are disposed below the plurality of conductive islands in the area under the fingertip.

17. A method of generating haptic feedback on a surface haptic display, the method including the steps of:

disposing a plurality of conductive islands at a first depth in close proximity to a front surface;

conductively isolating each of the plurality of conductive islands; disposing a plurality of first conductive traces and second conductive traces at a second depth, wherein a first set of conductive islands is substantially capacitively coupled to the first conductive traces and a second set of conductive islands is substantially capacitively coupled to the second conductive traces;

generating an attractive electrostatic force on a fingertip contiguous with the front surface; and charging at least one adjacent pair of conductive islands disposed in an area under the fingertip via a capacitive coupling to the first conductive trace and second conductive trace and wherein the attractive electrostatic force on the fingertip contiguous with the front surface increases a perceived friction force on the fingertip against movement of the fingertip parallel to the front surface; and enhancing an electrostatic attraction of the fingertip to the at least one adjacent pair of conductive islands in the area under the fingertip by applying one of a positive voltage signal and a negative voltage signal to the first conductive trace and another of the positive voltage signal and the negative voltage signal to the second conductive trace.

18. The method of claim 17, further comprising the step of cancelling the electrostatic attraction of the fingertip to the at least one adjacent pair of conductive islands in the area under the fingertip by applying one of a positive voltage signal and a negative voltage signal to the second conductive trace and another of the positive voltage signal and the negative voltage signal to the first conductive trace.

19. The method of claim 17, further comprising the step of measuring a mutual capacitance of at least one of the first and second conductive trace to determine a location of a fingertip in contact with the surface haptic display.

* * * * *